United States Patent
Roberts

(10) Patent No.: US 9,096,476 B2
(45) Date of Patent: Aug. 4, 2015

(54) STABILIZED N-ALKYL THIOSPHORIC TRIAMIDE SOLVENT SYSTEMS FOR USE IN NITROGEN FERTILIZER

(71) Applicant: HELENA HOLDING COMPANY, Wilmington, DE (US)

(72) Inventor: Johnnie R. Roberts, Arlington, TN (US)

(73) Assignee: HELENA CHEMICAL CORP., Collierville, TN (US)

(*) Notice: Subject to any disclaimer, the term of this patent is extended or adjusted under 35 U.S.C. 154(b) by 0 days.

(21) Appl. No.: 14/013,711

(22) Filed: Aug. 29, 2013

(65) Prior Publication Data

US 2014/0060132 A1    Mar. 6, 2014

Related U.S. Application Data

(60) Provisional application No. 61/695,658, filed on Aug. 31, 2012, provisional application No. 61/703,524, filed on Sep. 20, 2012.

(51) Int. Cl.

| | |
|---|---|
| C05C 9/00 | (2006.01) |
| C11D 3/16 | (2006.01) |
| C11D 3/20 | (2006.01) |
| C09K 15/04 | (2006.01) |
| C09K 15/06 | (2006.01) |
| C09K 15/08 | (2006.01) |
| C09K 15/12 | (2006.01) |
| C09K 15/18 | (2006.01) |
| C09K 15/26 | (2006.01) |
| C05G 3/00 | (2006.01) |
| A01C 21/00 | (2006.01) |
| A01G 1/00 | (2006.01) |
| C05G 3/08 | (2006.01) |

(52) U.S. Cl.
CPC . *C05G 3/00* (2013.01); *A01C 21/00* (2013.01); *A01G 1/001* (2013.01); *C05C 9/005* (2013.01); *C05G 3/08* (2013.01)

(58) Field of Classification Search
CPC .............. C05C 9/00; C05G 3/00; C11D 1/00
USPC .............. 71/28–30; 134/41, 42; 252/400.22; 510/109
See application file for complete search history.

(56) References Cited

U.S. PATENT DOCUMENTS

| | | | |
|---|---|---|---|
| 4,512,793 A * | 4/1985 | Harrison | 71/29 |
| 5,178,795 A | 1/1993 | Roberts | |
| 5,234,919 A | 8/1993 | Roberts | |
| 5,393,791 A | 2/1995 | Roberts | |
| 5,580,567 A | 12/1996 | Roberts | |
| 5,698,003 A * | 12/1997 | Omilinsky et al. | 71/28 |
| 5,725,630 A | 3/1998 | Roberts et al. | |
| 5,741,502 A | 4/1998 | Roberts | |
| 5,877,112 A | 3/1999 | Roberts et al. | |
| 5,906,961 A | 5/1999 | Roberts et al. | |
| 6,540,808 B2 | 4/2003 | Ma et al. | |
| 8,430,942 B2 * | 4/2013 | Urrutia et al. | 71/11 |
| 2003/0167683 A1 | 9/2003 | Moore et al. | |
| 2004/0055677 A1 | 3/2004 | Filippini et al. | |
| 2010/0168256 A1 * | 7/2010 | Rittig et al. | 514/788 |
| 2010/0184603 A1 | 7/2010 | Stoesser et al. | |
| 2010/0215611 A1 | 8/2010 | Rittig et al. | |
| 2010/0218575 A1 * | 9/2010 | Wissemeier et al. | 71/28 |
| 2011/0233474 A1 | 9/2011 | Cigler | |
| 2013/0174623 A1 * | 7/2013 | Gabrielson | 71/29 |

OTHER PUBLICATIONS

U.S. Appl. No. 13/967,836, filed Aug. 16, 2013, Roberts.
International Search Report for PCT/US 13/55104, mailing date Jan. 17, 2014.
International Search Report for PCT/US 13/57315, mailing date Jan. 7, 2014.
International Preliminary Report on Patentability for PCT/US2013/057315, mailing date Mar. 12, 2015.

* cited by examiner

*Primary Examiner* — Wayne Langel
(74) *Attorney, Agent, or Firm* — Drinker Biddle & Reath LLP

(57) ABSTRACT

The invention relates to a composition containing a stabilized solvent ketone, ester, or glycol liquid concentrate of at least one N-alkyl thiophosphoric triamide and at least one surfactant. The invention also relates to methods of using the composition.

21 Claims, No Drawings

STABILIZED N-ALKYL THIOSPHORIC TRIAMIDE SOLVENT SYSTEMS FOR USE IN NITROGEN FERTILIZER

RELATED APPLICATIONS

This Application claims the benefit of U.S. Provisional Application 61/695,658 filed on Aug. 31, 2012 and U.S. Provisional Application 61/703,524 filed on Sep. 20, 2012 which are both incorporated by reference in its entirety.

BACKGROUND OF THE INVENTION

A novel solvent system has been discovered that is capable of enhancing the application and storage stability, of nitrogen fertilizer stabilizing compositions that are based on n-alkyl thiophosphoric triamides. The existing art that deals with the formulation of n-alkyl thiophosphoric triamides for agricultural applications is based on the use of organic solvents that have a number of limitations related to cold weather stability, toxicity, fertilizer compatibility, cost, and clean-up. The new approach that I have discovered reduces or eliminates these problems.

N-alkyl thiophosphoric triamides (particularly n-butyl phosphorotriamide) (NBPT) are used extensively in applications with urea based fertilizers due to their ability to inhibit the urease enzyme. The urease enzyme is ubiquitous to most soils—and is responsible for the conversion of urea nitrogen to volatile ammonia gas. This volatile form of nitrogen is lost from the soil, thus reducing the amount that is available for plants. The ability of n-alkyl thiophosphoric triamides to provide this inhibition makes for a valuable tool in management of nitrogen fertilizer applications.

SUMMARY OF THE INVENTION

An object of the invention was to find a composition that eliminates or significantly reduces the problems discussed above and is capable of providing a liquid formulation that is both chemically and physically stable across a range of temperatures.

Another object of the invention is to find a formulation that can be used in a fertilizer that does not contain any ingredients that can be carcinogenic, such as 2-pyrrolidone or N-alkyl 2-pyrrolidones.

The current art lists a number of solvent options for N-alkyl thiophosphoric triamides. The use of various ketones, esters, and glycols have been disclosed as providing a basis for manufacturing stable N-alkyl thiophosphoric triamide formulations. Most of these compositions, unfortunately, have chemical and physical stability limitations. I have surprisingly found that certain surface active agents (surfactants) may be used to correct the chemical and/or physical storage stability problems of some n-alkyl thiophosphoric triamide solvent based formulations. While the exact mechanism for this stabilization is unknown, we have been able to utilize this phenomenon to produce liquid concentrates of n-alkyl thiophosphoric triamide in ester, ketone, and glycol based formulations. This stabilization provides for the manufacture of n-alkyl thiophosphoric triamide products that have chemical and physical stability superior to that of the ketones, glycols, and esters based formulations described in the current art.

The invention relates to a composition comprising
at least one N-alkyl thiophosphoric triamide,
a solvent, wherein the solvent is an aliphatic or aromatic ketones, esters, glycols, ethers, or organophosphates and at least one surfactant selected from the group consisting of:
Alcohol alkoxylates including but limited to:
    Based on branched and linear alcohols,
    Those containing ethylene oxide or propylene oxide,
Alcohol alkoxylate sulfates;
Alkylphenol alkoxylates including but not limited to:
    Nonylphenol and octylphenols,
    Those containing ethylene oxide or propylene oxide;
Alkylaryl sulfonates;
Amine oxides;
Amines including but not limited to:
    Fatty amine alkoxylates such as tallowamine alkoxylates;
Betaine derivatives;
Carboxylated alcohol or alkylphenol alkoxylates;
Ethoxylated amines;
Ethoxylated fatty acids;
Ethoxylated fatty esters and oils;
Fatty esters;
Glycerol esters;
Phosphate ester surfactants including but not limited to
    Phosphate esters of alcohol alkoxylates,
    Phosphate esters of alkylphenol alkoxylates;
Sarcosine derivatives;
Silicone-based surfactants;
Sorbitan derivatives including but not limited to:
    Sorbitan esters,
    Alkoxylated sorbitan esters;
Sucrose and glucose derivatives including but not limited to:
    Alkylpolyglucosides;
Sulfates and sulfonates of alkoxylated alkylphenols;
Sulfates of alcohols;
Tristyrylphenol Alkoxylates;
Polyethoxylated aliphatic phenols;
Polymers of Ethylene or Propylene oxides; or
Ethoxylated triglycerides and seed oils.
The surfactant is an effective amount to stabilize the solvent.

DETAILED DESCRIPTION OF THE INVENTION

As used herein, all percentages are on a weight basis unless otherwise stated herein or otherwise obvious here from to one skilled in the art.

The invention relates to a composition comprising
at least one N-alkyl thiophosphoric triamide,
a solvent, wherein the solvent is aliphatic or aromatic ketones, esters, glycols, ethers, or organophosphates,
at least one surfactant selected from the group consisting of:
Alcohol alkoxylates including but limited to:
    Based on branched and linear alcohols,
    Those containing ethylene oxide or propylene oxide,
Alcohol alkoxylate sulfates;
Alkylphenol alkoxylates including but not limited to:
    Nonylphenol and octylphenols,
    Those containing ethylene oxide or propylene oxide;
Alkylaryl sulfonates;
Amine oxides;
Amines including but not limited to:
    Fatty amine alkoxylates such as tallow amine alkoxylates;
Betaine derivatives;
Carboxylated alcohol or alkylphenol alkoxylates;
Ethoxylated amines;
Ethoxylated fatty acids;
Ethoxylated fatty esters and oils;
Fatty esters;
Glycerol esters;
Phosphate ester surfactants including but not limited to
    Phosphate esters of alcohol alkoxylates, Phosphate esters of alkylphenol alkoxylates;
Sarcosine derivatives;
Silicone-based surfactants;
Sorbitan derivatives including but not limited to:
    Sorbitan esters,
    Alkoxylated sorbitan esters;
Sucrose and glucose derivatives including but not limited to:
    Alkylpolyglucosides;
Sulfates and sulfonates of alkoxylated alkylphenols;
Sulfates of alcohols;
Tristyrylphenol Alkoxylates;
Polyethoxylated aliphatic phenols;
Polymers of Ethylene or Propylene oxides; or
Ethoxylated triglycerides and seed oils.

The surfactant is an effective amount to stabilize the solvent.

The solvents are aliphatic or aromatic ketones, esters, glycols, ethers, or organophosphates. The preferred solvents are propylene glycol, diethylene glycol, dibasic esters (DBE), glycol derivatives, glycol ethers, aliphatic or aromatic ketones or organophosphates. The solvents are present in an amount from 20 wt. % to 59 wt. % and preferably from 40-60 wt. % and most preferably from 40 wt. %-50 wt. %

The N-alkyl thiophosphoric triamide is preferably a $C_2$-$C_{10}$ alkyl and most preferably $C_4$ alkyl (NBPT). The concentration of N-alkyl thiophosphoric triamide ranges from preferably 1.0 to 50.0 wt. % based on the total composition, more preferably from 10 to 30% and even more preferably about 20 wt. %.

Examples of some preferred surfactant categories that can be used in these compositions include cationic, non-ionic, anionic and amphoteric surfactants. More specific types of preferred surfactants include non-ionic linear or branched alcohol ethoxylate surfactants, anionic phosphoric acid ester surfactants (sometimes referred to as "phosphate ester" surfactants), and cationic ethoxylated tallow amine surfactants. At least one surfactant selected from the groups below used at the level of 21-60 wt. % preferably 40 wt. %.

Useful surfactants include but are not limited to:
Alcohol alkoxylates including but limited to:
    Based on branched and linear alcohols,
    Those containing ethylene oxide or propylene oxide,
Alcohol alkoxylate sulfates;
Alkylphenol alkoxylates including but not limited to:
    Nonylphenol and octylphenols,
    Those containing ethylene oxide or propylene oxide;
Alkylaryl sulfonates;
Amine oxides;
Amines including but not limited to:
    Fatty amine alkoxylates such as tallowamine alkoxylates;
Betaine derivatives;
Carboxylated alcohol or alkylphenol alkoxylates;
Ethoxylated amines;
Ethoxylated fatty acids;
Ethoxylated fatty esters and oils;
Fatty esters;
Glycerol esters;
Phosphate ester surfactants including but not limited to
    Phosphate esters of alcohol alkoxylates,
    Phosphate esters of alkylphenol alkoxylates;
Sarcosine derivatives;
Silicone-based surfactants;
Sorbitan derivatives including but not limited to:
    Sorbitan esters,
    Alkoxylated sorbitan esters;
Sucrose and glucose derivatives including but not limited to:
    Alkylpolyglucosides;
Sulfates and sulfonates of alkoxylated alkylphenols;
Sulfates of alcohols;
Tristyrylphenol Alkoxylates;
Polyethoxylated aliphatic phenols;
Polymers of Ethylene or Propylene oxides; or
Ethoxylated triglycerides and seed oils.

Other surfactants as disclosed in McCutcheon's Emulsifiers and Detergents, North American Edition, 2000.

Other surfactants as disclosed in 1 the following patents:
U.S. Pat. No. 5,741,502 Homogeneous, essentially nonaqueous adjuvant compositions with buffering capability
U.S. Pat. No. 5,725,630 Dry granular fertilizer blend and a method of fertilizing plants
U.S. Pat. No. 5,580,567 Homogeneous, essentially nonaqueous adjuvant compositions with buffering capability
U.S. Pat. No. 5,393,791 Homogeneous, essentially nonaqueous adjuvant compositions with buffering capability
U.S. Pat. No. 5,234,919 Water soluble, highly active dimethoate formulations in an alcohol/ester solvent system
U.S. Pat. No. 5,178,795 Homogeneous, essentially nonaqueous adjuvant compositions with buffering capability
U.S. Pat. No. 5,906,961 Alkanolamide spreader-sticker surfactant combination
U.S. Pat. No. 5,877,112 Agricultural formulation A preferred surfactant is alcohol alkoxylates—both linear and branched. The alcohol preferably contains 2 to 20 carbons atoms, preferably 4 to 12 carbons and most preferably 9-11 carbon atoms. The alkoxylate is 2 to 20 moles added to the alcohol and most preferably 3-10 moles. Both propylene and ethylene oxide are used for the alkoxylation.

The invention also includes using the composition in a urea based fertilizer. The composition can be mixed with a liquid or dry fertilizer. A nitrogen stabilizing rate—can range from 0.001 to 0.1000% of the fertilizer.

The application of the liquid or dry fertilizer treated to soil, water, or other media that is used for the purposes of growing plants.

The application of the composition can be used as a method to improve the efficacy of nitrogen stabilization provided by an application N-alkyl thiophosphoric triamide treated fertilizer to soil, water, or other media used for the purposes of growing plants These solutions can be stored over extended periods of time and can conveniently serve as a vehicle to impregnate the N-alkyl thiophosphoric triamide onto urea based solid fertilizers using a variety of fertilizer bulk blending equipment commonly available with fertilizer dealers and distributors. Any suitable or conventional equipment can be used to apply the formulation to the solid fertilizer. Preferably the addition provides a thorough impregnation of the solid fertilizers by the formulation. The fact that these above mentioned formulations are universally miscible with the typical liquid urea containing fertilizers also makes these formulations extremely useful for these applications. Any suitable or conventional equipment can be used to incorporate the formulation into the liquid fertilizer.

The application of the composition according to the invention can be used as a means of reducing the toxicity of n-alkyl thiophosphoric triamide formulations.

The application of the composition according to the invention can be used as a means of improving the cold temperature stability of n-alkyl thiophosphoric triamide formulations.

The application of the according to the invention can be used as a means of improving the clean out of containers and equipment used to store and apply n-alkyl thiophosphoric triamide formulations.

Other adjuvants commonly used in agricultural compositions include compatibilizing agents, antifoam agents, sequestering agents, neutralizing agents and buffers, corrosion inhibitors, dyes, odorants, spreading agents, penetration aids, sticking agents, dispersing agents, thickening agents, freezing point depressants, antimicrobial agents, stabilizers and the like.

Dyes can be in an amount from 0.1 to 0.5 wt %.

Stabilizers can be but are not limited to organic acids. Examples of organic acids include but are not limited to citric acid, benzoic acid, acidic acid, salicylic acid, lactic acid, succinic acid, and oxalic acid. Stabilizers can be present in an amount from 0.1 to 1.0% and preferably from 0.1 to 0.2 wt. %.

Antifoam agents can include 2-ethyl hexanol or polydimethylsiloxane. Antifoaming agents can be present in an amount from 0.005 to 0.5 wt. % preferably from 0.05 to 0.1 wt. %.

| Formula (I) | |
|---|---|
| N-Butyl Thiophosphorotriamide | 20-28 wt. % |
| Polyethoxylated (2-20 moles) C4-C12 Alcohols (Branched or linear) -Alkyl only (no aryl groups) | 35.7-39.7% |
| Dibasic Esters (DBE) | 35.7-39.7 wt. % |
| Organic Acid | 0.1-0.2 wt. % |
| Dye | about 0.5 wt. % |
| Polydimethylsiloxane (anti-foam) | 0.05-0.10% |

| Formula (II) | |
|---|---|
| N-Butyl Thiophosphorotriamide | 20-28 wt. % |
| Polyethoxylated (2-20 moles) C4-C12 Alcohols (Branched or linear) -Alkyl only (no aryl groups) | 35.7-39.7 wt. % |
| Acetophenone | 35.7-39.7 wt. % |
| Organic Acid | 0.1-0.2 wt. % |
| Dye | about 0.5 wt. % |
| Polydimethylsiloxane (anti-foam) | 0.05-0.10% |

| Formula (III) | |
|---|---|
| N-Butyl Thiophosphorotriamide | 20-28 wt. % |
| Polyethoxylated (2-20 moles) C4-C12 Alcohols (Branched or linear) - Alkyl only (no aryl groups) | 30-50 wt. % |
| Propylene Glycol | 30-50 wt. % |
| Organic Acid | 0.1-.2 wt. % |
| Blue Dye | about 0.5 wt. % |
| Polydimethyl siloxane (antifoam) | 0.05-.10 wt. % |

| Formula (IV) | |
|---|---|
| N-Butyl Thiophosphorotriamide | 20-28 wt. % |
| Polyethoxylated (2-20 moles) C4-C12 Alcohols (Branched or linear) - Alkyl only (no aryl groups) | 30-50 wt. % |
| Diethylene Glycol | 30-50 wt. % |
| organic Acid | 0.1-.2 wt. % |
| Blue Dye | about 0.5 wt. % |
| Polydimethyl siloxane (antifoam) | 0.05-.10 wt. % |

| Formula (V) | |
|---|---|
| N-Butyl Thiophosphorotriamide | 20-28 wt. % |
| Polyethoxylated (2-20 moles) C4-C12 Alcohols (Branched or linear) - Alkyl only (no aryl groups) | 30-50 wt. % |
| Tributyl Phosphate | 30-50 wt. % |
| organic Acid | 0.1-.2 wt. % |
| Blue Dye | about 0.5 wt. % |
| Polydimethyl siloxane (antifoam) | 0.05-.10 wt. |

This recipe uses the stabilized solvent system described in provisional application No. 61/695,658 filed Aug. 31, 2012. While it does incorporate a glycol—it does not require nor use n-methyl pyrrolidone (NMP) nor any other form of amide or amine.

All the references described above are incorporated by reference in their entirety for all useful purposes.

I claim:

1. A composition comprising the following components:
   i) at least one N-alkyl thiophosphoric triamide,
   ii) a solvent which is an aliphatic or aromatic ketone, ester, glycol, ether or organophosphate,
   iii) an antifoam agent, and
   iv) at least one surfactant selected from the group consisting of:
   a) alcohol alkoxylate;
   b) alcohol alkoxylate sulfate;
   c) alkylphenol alkoxylate;
   d) alkylaryl sulfonate;
   e) amine oxide;
   f) amine;
   g) betaine derivatives;
   h) carboxylated alcohol or alkylphenol alkoxylate;
   i) ethoxylated amine;
   j) ethoxylated fatty acid;
   k) ethoxylated fatty esters or oils;
   l) fatty esters;
   m) glycerol esters;
   n) phosphate ester surfactants;
   o) sarcosine derivatives;
   p) silicone-based surfactants;
   q) sorbitan derivatives;
   r) sucrose and glucose derivatives;
   s) sulfates or sulfonates of alkoxylated alkylphenols;
   t) sulfates of alcohols;
   u) tristyrylphenol alkoxylates;
   v) polyethoxylated aliphatic phenol;
   w) polymers of ethylene or proplyene oxide; and
   x) ethoxylated triglycerides or seed oils.

2. The composition according to claim 1, wherein the concentration of said N-alkyl thiophosphoric triamide ranges from 1.0 to 60.0% by weight based on the weight of components i), ii), iii) and iv).

3. The composition according to claim 1, wherein the concentration of said N-alkyl thiophosphoric triamide ranges from 10 to 30.0% by weight based on the weight of components i), ii), iii) and iv).

4. The composition according to claim 1, wherein the concentration of said N-alkyl thiophosphoric triamide is present in about 20% by weight based on the weight of components i), ii), iii) and iv).

5. The composition according to claim 1, where the alkyl group in N-alkyl thiosphosphoric triamide is $C_2$-$C_{10}$ alkyl.

6. The composition according to claim 4, where the alkyl group in N-alkyl thiosphosphoric triamide is $C_4$ alkyl.

7. The composition according to claim 4, wherein the solvent is glycol.

8. The composition according to claim 4, wherein the solvent is dibasic ester.

9. The composition according to claim 4, wherein the solvent is propylene glycol.

10. The composition according to claim 4, wherein the solvent is diethylene glycol.

11. The composition as claimed in claim 1, wherein the antifoam agent is 2-ethyl hexanol or polydimethylsiloxane.

12. A composition consisting essentially of the formula (I), (II), (III), (IV) or (V),

| Formula (I) | |
|---|---|
| N-Butyl Thiophosphorotriamide | 20-28 wt. % |
| Polyethoxylated having 2-20 moles and C4-C12 Alcohols Branched or linear - Alkyl only with no aryl groups | 35.7-39.7% |
| Dibasic Esters | 35.7-39.7 wt. % |
| Organic Acid | 0.1-0.2 wt. % |

| | |
|---|---|
| Dye | about 0.5 wt. % |
| Polydimethylsiloxane | 0.05-0.10% |
| Formula (II) | |
| N-Butyl Thiophosphorotriamide | 20-28 wt. % |
| Polyethoxylated having 2-20 moles and C4-C12 Alcohols Branched or linear - Alkyl only with no aryl groups | 35.7-39.7 wt. % |
| Acetophenone | 35.7-39.7 wt. % |
| Organic Acid | 0.1-0.2 wt. % |
| Dye | about 0.5 wt. % |
| Polydimethylsiloxane | 0.05-0.10% |
| Formula (III) | |
| N-Butyl Thiophosphorotriamide | 20-28 wt. % |
| Polyethoxylated having 2-20 moles and C4-C12 Alcohols Branched or linear - Alkyl only with no aryl groups | 30-50 wt. % |
| Propylene Glycol | 30-50 wt. % |
| Organic Acid | 0.1-.2 wt. % |
| Blue Dye | about 0.5 wt. % |
| Polydimethyl siloxane | 0.05-.10 wt. % |
| Formula (IV) | |
| N-Butyl Thiophosphorotriamide | 20-28 wt. % |
| Polyethoxylated having 2-20 moles and C4-C12 Alcohols Branched or linear - Alkyl only with no aryl groups | 30-50 wt. % |
| Diethylene Glycol | 30-50 wt. % |
| organic Acid | 0.1-.2 wt. % |
| Blue Dye | about 0.5 wt. % |
| Polydimethyl siloxane | 0.05-.10 wt. % |
| Formula (V) | |
| N-Butyl Thiophosphorotriamide | 20-28 wt. % |
| Polyethoxylated having 2-20 moles and C4-C12 Alcohols Branched or linear - Alkyl only with no aryl groups | 30-50 wt. % |
| Tributyl Phosphate | 30-50 wt. % |
| organic Acid | 0.1-.2 wt. % |
| Blue Dye | about 0.5 wt. % |
| Polydimethyl siloxane | 0.05-.10 wt. %. |

13. The composition as claimed in claim 12, wherein the antifoam agent is 2-ethyl hexanol or polydimethylsiloxane.

14. A fertilizer which comprises a urea based fertilizer and the composition as claimed claim 1.

15. The fertilizer as claimed in claim 14, wherein the urea based fertilizer is a liquid or dry fertilizer.

16. A method of making a fertilizer which comprises mixing ingredients i), ii), iii) and iv) of the composition as claimed in claim 1 with a liquid or dry urea based fertilizer.

17. A process to grow plants which comprises adding the fertilizer as claimed in claim 14 to a soil, water, or other media that is used for the purposes of growing plants.

18. A process to improve the efficacy of nitrogen stabilization provided by an application N-alkyl thiophosphoric triamide treated fertilizer to soil, water, or other media used for the purposes of growing plants which comprises utilizing adding the composition as claimed in claim 1 to a plant.

19. A process for reducing the toxicity of an n-alkyl thiophosphoric triamide formulation which comprises adding the composition as claimed in claim 1 to the n-alkyl thiophosphoric triamide formulation.

20. A process for improving the cold temperature stability of an n-alkyl thiophosphoric triamide formulations formulation which comprises adding the composition as claimed in claim 1 to the n-alkyl thiophosphoric triamide formulation.

21. A process for improving the clean out of containers and equipment used to store and apply n-alkyl thiophosphoric triamide formulations which comprises utilizing the composition as claimed in claim 1.

\* \* \* \* \*